United States Patent
Lv et al.

(10) Patent No.: US 11,218,332 B2
(45) Date of Patent: Jan. 4, 2022

(54) DATA TRANSMISSION METHOD AND SMART HOUSEHOLD CONTROL DEVICE

(71) Applicant: HUAWEI TECHNOLOGIES CO., LTD., Guangdong (CN)

(72) Inventors: Xin Lv, Wuhan (CN); Jinzhou Xie, Wuhan (CN); Guangyuan Li, Wuhan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 480 days.

(21) Appl. No.: 16/304,995

(22) PCT Filed: May 16, 2017

(86) PCT No.: PCT/CN2017/084615
§ 371 (c)(1),
(2) Date: Nov. 27, 2018

(87) PCT Pub. No.: WO2017/202231
PCT Pub. Date: Nov. 30, 2017

(65) Prior Publication Data
US 2021/0176084 A1    Jun. 10, 2021

(30) Foreign Application Priority Data
May 27, 2016   (CN) .......................... 201610370046.1

(51) Int. Cl.
*H04L 12/28*      (2006.01)
*H04W 4/80*       (2018.01)

(52) U.S. Cl.
CPC ...... *H04L 12/2816* (2013.01); *H04L 12/2809* (2013.01); *H04L 12/2814* (2013.01); *H04W 4/80* (2018.02); *H04L 2012/2841* (2013.01)

(58) Field of Classification Search
CPC ............ H04L 12/2814; H04L 12/2825; H04L 2012/2841; H04L 12/2816; H04L 12/2809; H04W 4/80
See application file for complete search history.

(56) References Cited

U.S. PATENT DOCUMENTS 7,215,659 B1   5/2007 Chen et al.
7,830,834 B2  11/2010 Das et al.
(Continued)

FOREIGN PATENT DOCUMENTS

| CN | 104754588 A | 7/2015 |
| CN | 104902545 A | 9/2015 |
| CN | 104969649 A | 10/2015 |

OTHER PUBLICATIONS

IEEE Std 802.15.4™-2006.Part 15.4: Wireless Medium Access Control (MAC) and Physical Layer (PHY) Specifications for Low-Rate Wireless Personal Area Networks (WPANs), Sep. 8, 2006. total 323 pages.
(Continued)

*Primary Examiner* — Tuan C Dao
(74) *Attorney, Agent, or Firm* — Fish & Richardson P.C.

(57) ABSTRACT

A data transmission method and a smart household control device are provided. The smart household control device sends or receives WiFi data within a first preset period in each preset timing cycle if a smart household control device needs to send or receive WiFi data and ZigBee data; and when the first preset period ends, it stops sending or receiving WiFi data, and sends a first control instruction to a wireless access point device, where the first control instruction is used to instruct the wireless access point device to stop sending WiFi data to the smart household control device; and then it sends or receives ZigBee data within a second preset period in each preset timing cycle, where the first preset period and the second preset period do not
(Continued)

overlap. So interference can be avoided between WiFi communication and ZigBee communication.

20 Claims, 3 Drawing Sheets

(56) References Cited

U.S. PATENT DOCUMENTS

| | | | | |
|---|---|---|---|---|
| 2013/0090968 | A1* | 4/2013 | Borza | G06Q 10/06 |
| | | | | 705/7.16 |
| 2013/0155957 | A1* | 6/2013 | Shin | H04W 52/0245 |
| | | | | 370/328 |
| 2014/0172184 | A1* | 6/2014 | Schmidt | G05B 15/02 |
| | | | | 700/295 |
| 2014/0219193 | A1 | 8/2014 | Linde et al. | |
| 2014/0347289 | A1* | 11/2014 | Suh | G06F 3/017 |
| | | | | 345/173 |
| 2015/0237505 | A1 | 8/2015 | Su et al. | |
| 2015/0365003 | A1* | 12/2015 | Sadwick | H02M 3/28 |
| | | | | 363/21.01 |
| 2016/0112991 | A1* | 4/2016 | Chen | H04B 1/525 |
| | | | | 455/553.1 |
| 2018/0160184 | A1* | 6/2018 | Alcaide | H04N 21/4622 |

OTHER PUBLICATIONS

IEEE802.11-2012, Part 11:Wireless LAN Medium Access Control(MAC) and Physical Layer(PHY) Specifications, IEEE Computer Society,dated Mar. 29, 2012,total 2793 pages.

International Search Report and Written Opinion issued in International Application No. PCT/CN2017/084615 dated Aug. 15, 2017,17 pages.

Office Action issued in Chinese Application No. 201610370046.1 dated May 17, 2019, 13 pages (with English translation).

* cited by examiner

FIG. 3

DATA TRANSMISSION METHOD AND SMART HOUSEHOLD CONTROL DEVICE

CROSS-REFERENCE TO RELATED APPLICATION

This application is a national stage of International Application No. PCT/CN2017/084615, filed on May 16, 2017, which claims priority to Chinese Patent Application No. 201610370046.1, filed on May 27, 2016. Both of the aforementioned applications are hereby incorporated by reference in their entireties.

TECHNICAL FIELD

The present invention relates to the field of wireless communications technologies, and in particular, to a data transmission method and a smart household control device.

BACKGROUND

With development of science and technology, a wireless network has developed rapidly, and wireless network communications technologies such as Wireless Fidelity (English: Wireless Fidelity, WiFi) and ZigBee have been increasingly applied in daily life.

WiFi is a wireless network communications technology based on the IEEE802.11 standard, and is one of the most popular network protocols deployed in common application scenarios, such as an office, a home, an entertainment venue, and an urban outdoor area. ZigBee is a wireless network communications technology based on the IEEE802.15.4 protocol. Characterized by low power consumption, low costs, and low complexity, ZigBee is widely applied to the field of an Internet of Things technology. With continuous growth of low-rate application market demands, an increasing quantity of application scenarios require both WiFi and ZigBee. However, WiFi and ZigBee both operate on an industrial scientific medical (English: Industrial Scientific Medical, ISM) frequency band of 2.4 GHz, as a result, mutual interference is inevitably generated between WiFi and ZigBee.

WiFi divides the ISM frequency band of 2.4 GHz into 13 direct sequence spread spectrum channels, and a channel bandwidth is 22 MHz. ZigBee divides the ISM frequency band into 16 channels, and a bandwidth of each channel is 2 MHz. Most of the 13 WiFi channels overlap with the ZigBee channels, and a maximum of three channels do not overlap with the ZigBee channels. Apparently, if a WiFi system operates on any channel, a probability that a channel frequency of a ZigBee system overlaps with a channel frequency of the WiFi system is ¼. When WiFi and ZigBee use a same frequency band for communication, mutual interference is generated. Therefore, it is particularly important to develop a method for reducing mutual interference between WiFi and ZigBee in a device.

SUMMARY

Embodiments of the present invention provide a data transmission method and a smart household control device, so as to avoid mutual interference between WiFi communication and ZigBee communication, and ensure quality of WiFi communication and ZigBee communication.

According to a first aspect, a data transmission method is provided, and the method includes:

sending or receiving WiFi data within a first preset period in each preset timing cycle if a smart household control device needs to send or receive WiFi data and ZigBee data; and when the first preset period ends, stopping sending or receiving WiFi data, and sending a first control instruction to a wireless access point device, where the first control instruction is used to instruct the wireless access point device to stop sending WiFi data to the smart household control device; and sending or receiving, by the smart household control device, ZigBee data within a second preset period in each preset timing cycle, where the first preset period and the second preset period do not overlap.

By implementing the method described in the first aspect, if WiFi data and ZigBee data need to be transmitted, WiFi data is sent or received within the first preset period in the preset timing cycle, and ZigBee data is sent or received within the second preset period. The period for sending or receiving WiFi data is different from the period for sending or receiving ZigBee data, so that mutual interference can be avoided between WiFi communication and ZigBee communication, and quality of WiFi communication and ZigBee communication is ensured.

With reference to the first aspect, in a first implementation of the first aspect, the method further includes:

sending or receiving ZigBee data within the first preset period, and retransmitting ZigBee data if failing to send ZigBee data, where duration from a start of the first preset period to a start of the second preset period is less than maximum duration for retransmitting ZigBee data.

By executing the foregoing steps, ZigBee data may not only be sent or received within the second preset period, but also be sent or received within the first preset period if ZigBee data needs to be transmitted, so as to meet a ZigBee communication requirement. In addition, if ZigBee data fails to be sent due to interference of WiFi communication, ZigBee data retransmission may also be triggered. The duration from the start of the first preset period to the start of the second preset period is less than the maximum duration for retransmitting ZigBee data. This may ensure that ZigBee data unsuccessfully transmitted within the first preset period can be successfully transmitted within the second preset period. Therefore, it is ensured that no ZigBee data is lost, and a packet loss rate of ZigBee is reduced, thereby improving ZigBee communication quality. In addition, because transmit power of WiFi is far greater than transmit power of ZigBee, interference caused to ZigBee by WiFi when ZigBee data and WiFi data are transmitted within a same period can almost be ignored. Therefore, ZigBee communication does not affect WiFi communication quality.

With reference to the first aspect, in a second implementation of the first aspect, the method further includes:

when the second preset period ends, stopping sending or receiving ZigBee data, and sending a second control instruction to a smart household device, where the second control instruction is used to instruct the smart household device to stop sending ZigBee data to the smart household control device.

By executing the foregoing steps, ZigBee data is sent or received within only the second preset period, that is, ZigBee data is not sent or received within the first preset period; and when the second preset period ends, the smart household control device sends a second control instruction to a smart household device at a peer end, to instruct the smart household device to stop sending ZigBee data to the smart household control device, thereby avoiding interference caused to WiFi communication by ZigBee communication within the first preset period, and improving WiFi communication quality.

With reference to the second implementation of the first aspect, in a third implementation of the first aspect, the method further includes:

when the first preset period ends, sending a third control instruction to the smart household device, where the third control instruction is used to instruct the smart household device to send ZigBee data to the smart household control device.

By executing the foregoing steps, WiFi data is sent or received within the first preset period; and when the first preset period ends, the smart household control device notifies the smart household device that the smart household device may send ZigBee data to the smart household control device, so as to continue to transmit ZigBee data in a case of no WiFi interference, ensuring normal ZigBee communication.

With reference to any one of the first aspect or the implementations of the first aspect, in a fourth implementation of the first aspect, the method further includes:

when the second preset period ends, sending a fourth control instruction to the wireless access point device, where the fourth control instruction is used to instruct the wireless access point device to send WiFi data to the smart household control device.

By executing the foregoing steps, ZigBee data is sent or received within the second preset period; and when the second preset period ends, the smart household control device notifies the wireless access point device that the wireless access point device may send WiFi data to the smart household control device, so as to continue to transmit WiFi data, ensuring normal WiFi communication.

According to a second aspect, a smart household control device is provided, the smart household control device includes a WiFi communications module, a ZigBee communications module, and a controller, and the controller is configured to perform the following operations:

if the smart household control device needs to send or receive WiFi data and ZigBee data, controlling, by the controller, the WiFi communications module to send or receive WiFi data within a first preset period in each preset timing cycle; and when the first preset period ends, controlling the WiFi communications module to stop sending or receiving WiFi data, and controlling the WiFi communications module to send a first control instruction to a wireless access point device, where the first control instruction is used to instruct the wireless access point device to stop sending WiFi data to the smart household control device; and controlling, by the controller, the ZigBee communications module to send or receive ZigBee data within a second preset period in each preset timing cycle, where the first preset period and the second preset period do not overlap.

By performing the foregoing operations, if WiFi data and ZigBee data need to be transmitted, the smart household control device sends or receives WiFi data within the first preset period in the preset timing cycle, and sends or receives ZigBee data within the second preset period. The period for sending or receiving WiFi data is different from the period for sending or receiving ZigBee data, so that mutual interference can be avoided between WiFi communication and ZigBee communication, and quality of WiFi communication and ZigBee communication is ensured.

With reference to the second aspect, in a first implementation of the second aspect, the controller is further configured to:

control the ZigBee communications module to send or receive ZigBee data within the first preset period, and control the ZigBee communications module to retransmit ZigBee data if ZigBee data fails to be sent, where duration from a start of the first preset period to a start of the second preset period is less than maximum duration for retransmitting ZigBee data.

By performing the foregoing operations, ZigBee data may not only be sent or received within the second preset period, but also be sent or received within the first preset period if ZigBee data needs to be transmitted, so as to meet a ZigBee communication requirement. If ZigBee data fails to be sent due to interference of WiFi communication, ZigBee data retransmission may also be triggered, and the duration from the start of the first preset period to the start of the second preset period is less than the maximum duration for retransmitting ZigBee data. This may ensure that ZigBee data unsuccessfully transmitted within the first preset period can be successfully transmitted within the second preset period. Therefore, it is ensured that no ZigBee data is lost, and a packet loss rate of ZigBee is reduced, thereby improving ZigBee communication quality. In addition, because transmit power of WiFi is far greater than transmit power of ZigBee, interference caused to ZigBee by WiFi when ZigBee data and WiFi data are transmitted within a same period can almost be ignored. Therefore, ZigBee communication does not affect WiFi communication quality.

With reference to the second aspect, in a second implementation of the second aspect, the controller is further configured to:

when the second preset period ends, control the ZigBee communications module to stop sending or receiving ZigBee data, and control the ZigBee communications module to send a second control instruction to a smart household device, where the second control instruction is used to instruct the smart household device to stop sending ZigBee data to the smart household control device.

By performing the foregoing operations, ZigBee data is sent or received within only the second preset period, that is, ZigBee data is not sent or received within the first preset period; and when the second preset period ends, the smart household control device sends a second control instruction to a smart household device at a peer end, to instruct the smart household device to stop sending ZigBee data to the smart household control device, thereby avoiding interference caused to WiFi communication by ZigBee communication within the first preset period, and improving WiFi communication quality.

With reference to the second implementation of the second aspect, in a third implementation of the second aspect, the controller is further configured to:

when the first preset period ends, control the ZigBee communications module to send a third control instruction to the smart household device, where the third control instruction is used to instruct the smart household device to send ZigBee data to the smart household control device.

By performing the foregoing operations, WiFi data is sent or received within the first preset period; and when the first preset period ends, the smart household control device notifies the smart household device that the smart household device may send ZigBee data to the smart household control device, so as to continue to transmit ZigBee data in a case of no WiFi interference, ensuring normal ZigBee communication.

With reference to any one of the second aspect or the implementations of the second aspect, in a fourth implementation of the second aspect, the controller is further configured to:

when the second preset period ends, control the WiFi communications module to send a fourth control instruction to the wireless access point device, where the fourth control instruction is used to instruct the wireless access point device to send WiFi data to the smart household control device.

By performing the foregoing operations, ZigBee data is sent or received within the second preset period; and when the second preset period ends, the smart household control device notifies the wireless access point device that the wireless access point device may send WiFi data to the smart household control device, so as to continue to transmit WiFi data, ensuring normal WiFi communication.

According to a third aspect, a smart household control device is provided, and the smart household control device includes a module or unit configured to execute the data transmission method described in the first aspect or any implementation of the first aspect.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

The following clearly describes the technical solutions in the embodiments of the present invention with reference to the accompanying drawings in the embodiments of the present invention.

Figure 1:
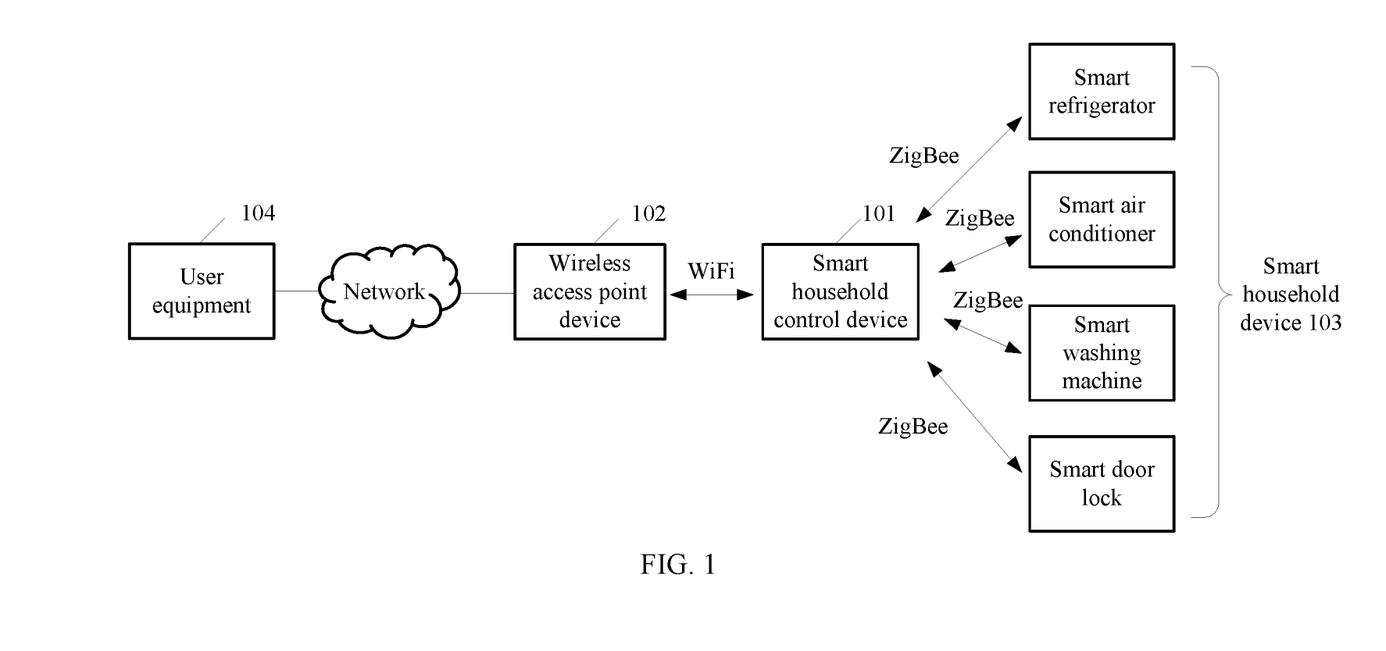
FIG. 1 is a schematic architecture diagram of a smart household control system according to an embodiment of the present invention.

Referring to FIG. 1, FIG. 1 is a schematic architecture diagram of a smart household control system according to an embodiment of the present invention. As shown in FIG. 1, the smart household control system includes a smart household control device 101, a wireless access point device 102, a smart household device 103, and user equipment 104. The smart household control device 101 may be a smart household controller provided with a WiFi communications module and a ZigBee communications module, to implement centralized control on the smart household device 103. The smart household control device 101 may perform WiFi data communication with the wireless access point device 102 and the user equipment 104 by using the WiFi communications module, and the smart household control device 101 may perform ZigBee data communication with the smart household device 103 by using the ZigBee communications module.

The wireless access point device 102 has a built-in WiFi communications module, and the wireless access point device 102 includes but is not limited to a wireless router and a wireless card. The wireless access point device 102 is configured to receive information or data sent by the smart household control device 101 and store the information or data, and may further send the information or data to the user equipment 104 by means of WiFi wireless communication or Internet communication. A user may control the smart household device 103 by using the user equipment 104, for example, the user equipment 104 controls, by using the wireless access point device 102, a smart air conditioner to turn down a temperature, or control a smart door lock to be opened.

The smart household device 103 includes but is not limited to a smart refrigerator, a smart air conditioner, a smart washing machine, a smart door, and the like. The smart household device 103 has a built-in ZigBee communications module, and the smart household device 103 may also be provided with a sensor. The sensor includes but is not limited to a temperature sensor, a humidity sensor, a gas concentration sensor, a fingerprint sensor, an infrared sensor, and a distance sensor that are configured to collect temperature information, humidity information, gas concentration information, fingerprint information, infrared information, and distance information, respectively. The smart household device 103 transmits collected information or data to the smart household control device 101. The smart household device 103 may be provided with a timer. The smart household device 103 transmits the collected information or data to the smart household control device 101 when a preset time of the timer elapses; or the smart household device 103 receives a control instruction transmitted from the smart household control device 101, and transmits the collected information or data to the smart household control device 101 according to the control instruction.

The user equipment 104 includes but is not limited to a smartphone (such as an Android phone and an iOS phone), a tablet computer, a palmtop computer, a notebook computer, a mobile Internet device (English: Mobile Internet Devices, MID), a wearable device (such as a smart watch and a smart band), and the like. The user equipment 104 may be connected to the wireless access point device 102 in a WiFi connection manner, or the user equipment 104 is connected to the wireless access point device 102 by using the Internet, to perform remote control on the smart household device 103.

The WiFi communications module of the smart household control device 101 works in station (English: Station, STA) mode, and the ZigBee communications module of the smart household control device 101 works in host mode.

It should be noted that the wireless access point device 102 may also be provided with a ZigBee communications module, the wireless access point device 102 may perform WiFi communication with the user equipment 104 by using the WiFi communications module, or may perform communication with the user equipment 104 by using the Internet, and the wireless access point device 102 performs ZigBee communication with the smart household device 103 by using the ZigBee communications module.

Figure 2:
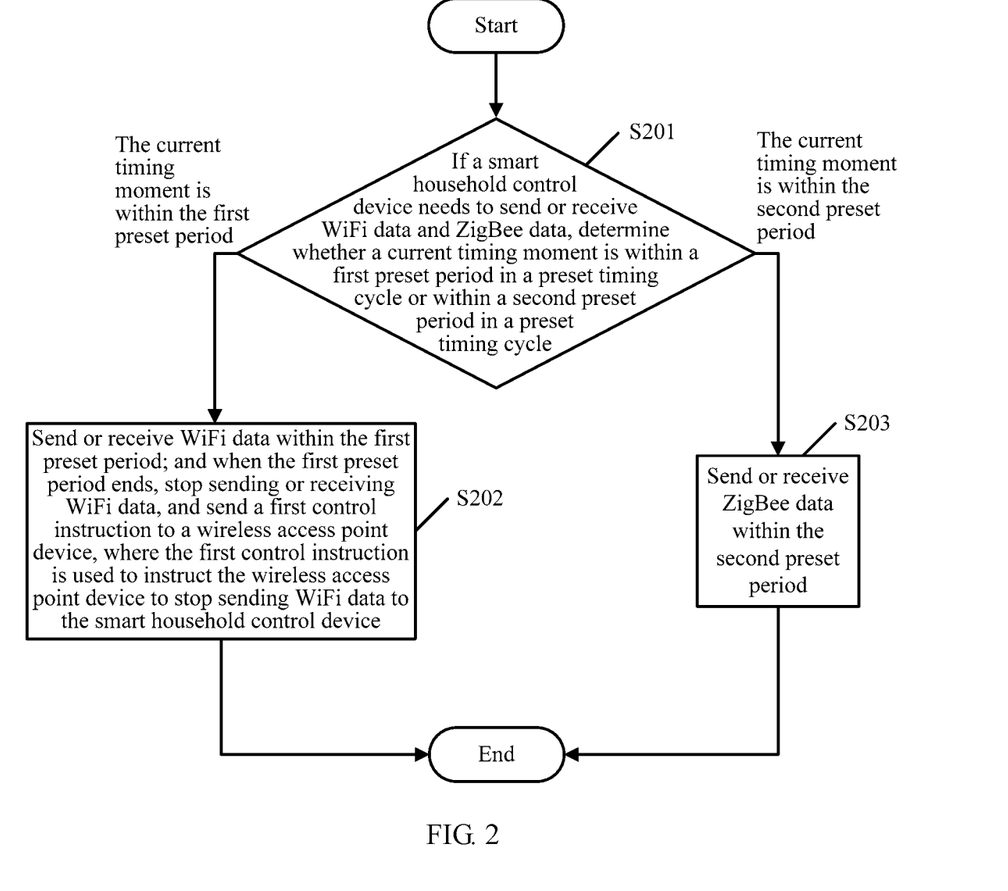
FIG. 2 is a schematic flowchart of a data transmission method according to an embodiment of the present invention.

Referring to FIG. 2, FIG. 2 is a schematic flowchart of a data transmission method according to an embodiment of the present invention. As shown in FIG. 2, the data transmission method may include but is not limited to the following steps.

S201. If a smart household control device needs to send or receive WiFi data and ZigBee data, determine whether a current timing moment is within a first preset period in a preset timing cycle or within a second preset period in a preset timing cycle. If the current timing moment is within the first preset period, execute step S202; or if the current timing moment is within the second preset period, execute step S203.

It should be noted that the smart household control device may transmit WiFi data and ZigBee data at the same time, or may transmit only WiFi data or ZigBee data at a time. No specific limitation is set in this embodiment of the present invention. A solution in this embodiment of the present invention can be used to solve a problem of mutual interference between WiFi communication and ZigBee communication, provided that the smart household control device supports sending or receiving of both WiFi data and ZigBee data.

If the smart household control device needs to send or receive WiFi data and ZigBee data, a time for sending or receiving WiFi data needs to be different from a time for sending or receiving ZigBee data, so as to ensure that there is no mutual interference between WiFi data transmission and ZigBee data transmission, thereby ensuring quality of WiFi communication and ZigBee communication. Specifically, the smart household control device may have a built-in timer to periodically perform timing. If WiFi data and ZigBee data need to be transmitted, the smart household control device determines whether the current timing moment is within the first preset period or the second preset period, so as to determine whether WiFi communication or ZigBee communications is performed currently. The preset timing cycle, the first preset period, and the second preset period may be system default settings of the smart household control device, may be set by a user by using a wireless access point device for the smart household control device, or may be set by a user directly by using a user interface (such as a touchscreen, a button key, and a microphone) of the smart household control device. No specific limitation is set in this embodiment of the present invention. For example, the preset timing cycle is 100 ms, and the period of 100 ms is divided into several periods. The first preset period is from the $0^{th}$ ms to the $59^{th}$ ms, and the second preset period is from the 60th ms to the 99th ms. If the current timing moment is the 23th ms, it is determined that the current timing moment is within the first preset period; or if the current timing moment is the 70th ms, it is determined that the current timing moment is within the second preset period.

S202. Send or receive WiFi data within the first preset period; and when the first preset period ends, stop sending or receiving WiFi data, and send a first control instruction to the wireless access point device, where the first control instruction is used to instruct the wireless access point device to stop sending WiFi data to the smart household control device.

If the smart household control device determines that the current timing moment is within the first preset period, send or receive WiFi data. For example, within the first preset period, the smart household control device receives, by using the WiFi communications module, the control instruction sent by the wireless access point device, for example, the smart household control device receives, by using the WiFi communications module, an instruction of uploading temperature information of a smart refrigerator sent by the wireless access point device. For another example, within the first preset period, the smart household control device sends, to the wireless access point device by using the WiFi communications module, information or data collected by a smart household device, for example, the smart household control device sends temperature information of a smart refrigerator to the wireless access point device by using the WiFi communications module.

When the first preset period ends, the smart household control device needs to stop sending or receiving WiFi data, and further needs to send the first control instruction to the wireless access point device to instruct the wireless access point device to stop sending WiFi data to the smart household control device, so as to ensure that, within the second preset period, no interference is caused to ZigBee data transmission by WiFi data transmission, thereby ensuring normal ZigBee data communication.

For example, the WiFi communications module of the smart household control device operates in STA mode. When the first preset period ends, the smart household control device controls the WiFi communications module to enter a standby state and to send or receive no WiFi data any more, so as to reduce system power consumption; and sends the first control instruction to the wireless access point device by using the WiFi communications module, where the first control instruction is used to indicate that the smart household control device has entered the standby state. After receiving the first control instruction, the wireless access point device learns that the smart household control device has entered the standby state, and therefore, the wireless access point device does not send data to the smart household control device, and temporarily stores WiFi data that needs to be sent to the smart household control device, so as to send the temporarily stored WiFi data to the smart household control device when the smart household control device can transmit WiFi data subsequently. Therefore, the wireless access point device does not send WiFi data to the smart household control device within the second preset period, and no interference is caused to ZigBee communication.

S203. Send or receive ZigBee data within the second preset period.

If determining that the current timing moment is within the second preset period, the smart household control device sends or receives ZigBee data. For example, the smart household control device receives, within the second preset period by using a ZigBee communications module, information or data sent by the smart household device, for example, receives temperature information and humidity information of a smart refrigerator by using the ZigBee communications module. For another example, the smart household control device sends a control instruction to the smart household device within the second preset period by using a ZigBee communications module, for example, sends an instruction of uploading temperature information to the smart refrigerator by using the ZigBee communications module, and after receiving the instruction, the smart refrigerator sends the temperature information to the smart household control device by using the ZigBee communications module. The first preset period and the second preset period do not overlap, to ensure that there is no mutual interference between WiFi data transmission and ZigBee data transmission.

Optionally, ZigBee data may not only be sent or received within the second preset period, but also be sent or received within the first preset period if ZigBee data needs to be transmitted within the first preset period, so as to meet a ZigBee communication requirement; if ZigBee data fails to be sent due to WiFi communication interference, ZigBee data retransmission may also be triggered; and duration from a start of the first preset period to a start of the second preset period is less than maximum duration for retransmitting ZigBee data. This may ensure that ZigBee data unsuccessfully transmitted within the first preset period can be successfully transmitted within the second preset period. Therefore, it is ensured that no ZigBee data is lost, and a packet loss rate of ZigBee is reduced, thereby improving ZigBee communication quality. In addition, because transmit power of WiFi is far greater than transmit power of ZigBee, interference caused to ZigBee by WiFi when ZigBee data and WiFi data are transmitted within a same period can almost be ignored. Therefore, ZigBee communication does not affect WiFi communication quality.

It should be noted that a ZigBee data reselection process mainly includes the following steps: Step 1: A timeout timer of an application layer is started when the application layer transmits a to-be-transmitted data message to a lower network layer for encapsulation. Step 2: A timeout timer of the network layer is started when the network layer encapsulates the data message to obtain a data packet, and transmits the data packet to a lower medium access control (English: Medium Access Control, MAC) layer for encapsulation. Step 3: The MAC layer adds a corresponding MAC address to the data packet to obtain a data frame, and further sends the data frame to a communications peer end, and a timeout timer of the MAC layer is started at this time. When a preset time of the timeout timer elapses, it indicates that sending at the MAC layer fails, and retransmission is performed at the MAC layer. In addition, the MAC layer randomly selects an avoidance cycle (each avoidance cycle is 320 us) at each time of transmission to perform retransmission, and attempts to retransmit a data frame for a maximum of six times. Step 4: When a preset time of the timeout timer of the network layer elapses, it indicates that sending at the network layer fails, and retransmission is performed at the network layer. There is a random waiting time of 16 ms to 48 ms for each time of transmission, and a total waiting time at the network layer cannot exceed 500 ms. Each time when the network layer retransmits the data packet to the MAC layer, the MAC layer needs to perform re-encapsulation and executes step 3 by attempting to retransmit a data frame for a maximum of six times. Step 5: When a preset time of the timeout timer of the application layer elapses, it indicates that sending at the application layer fails, and the application layer performs retransmission. There is a maximum waiting time of 1.6 s for each time of retransmission by the application layer, and a maximum of three sending attempts are performed. If the three sending attempts all fail, the data fails to be sent. In addition, each time when the application layer retransmits a data message to the MAC layer, the network layer needs to perform re-encapsulation, the MAC layer also needs to perform re-encapsulation, and executes step 3 and attempts to retransmit a data frame for a maximum of six times, and the network layer also needs to execute step 4. A retransmission period at the MAC layer and a retransmission period at the network layer are included in a retransmission period at the application layer. Therefore, the maximum duration for ZigBee retransmission is duration for ZigBee data message retransmission at the application layer, that is 1.65× 3=4.8 s. The duration from the start of the first preset period to the start of the second preset period needs to be less than 4.8 s. Specific duration being set may be adjusted according to an actual application scenario, and no specific limitation is set in this embodiment of the present invention. For example, the duration from the start of the first preset period to the start of the second preset period is 60 ms.

Optionally, ZigBee data can be sent or received within only the second preset period; and when the second preset period ends, the smart household control device needs to stop sending or receiving ZigBee data, and needs to send a second control instruction to the smart household device, to instruct the smart household device to stop sending ZigBee data to the smart household control device, thereby avoiding interference caused to WiFi communication by ZigBee communication within the first preset period, and improving WiFi communication quality. Optionally, a timer may be disposed in the smart household device, and the smart household device sends the collected information or data to a smart household control device only when a preset time of the timeout timer elapses. Therefore, the smart household control device and the smart household device may pre-negotiate a period for transmitting ZigBee data, to ensure that a period for the smart household device to send ZigBee data to the smart household control device certainly falls within the second preset period, and when the second preset period ends, the smart household device determines that no ZigBee data may be sent to the smart household control device. For example, the timing cycle of the timer of the smart household control device is 100 ms, the 0th ms to the 59th ms is the first preset period, and the 60th ms to the 99th ms is the second preset period. The timer of the smart household device may also be set to 100 ms, and the period for sending ZigBee data is set to a period from the $60^{th}$ ms to the $99^{th}$ ms. Therefore, at the 99th ms, the smart household device determines to continue to send no ZigBee data to the smart household control device.

Optionally, when the first preset period ends, the smart household control device sends a third control instruction to the smart household device, to instruct the smart household device to send ZigBee data to smart household control device. WiFi data is sent or received within the first preset period. When the first preset period ends, the smart household control device notifies the smart household device that the smart household device may send ZigBee data to the smart household control device, so as to continue to transmit ZigBee data in a case of no WiFi interference, ensuring normal ZigBee communication. Optionally, the smart household control device and the smart household device may pre-negotiate a period for transmitting ZigBee data. In this way, when the first preset period ends, the smart household device can determine that ZigBee data may be sent to the smart household control device. For example, the timing cycle of the timer of the smart household control device is 100 ms, the 0th ms to the 59th ms is the first preset period, and the 60th ms to the 99th ms is the second preset period. The timer of the smart household device may also be set to 100 ms, and the period for sending ZigBee data is set to a period from the $60^{th}$ ms to the $99^{th}$ ms. Therefore, at the 60th ms, the smart household device can determine that ZigBee data may be sent to the smart household control device.

Optionally, if WiFi data needs to be sent within the second preset period, the smart household control device caches the to-be-sent WiFi data to transmit WiFi data in a next first preset period. In this way, no data is lost due to a transmission delay.

Optionally, when the second preset period ends, the smart household control device sends a fourth control instruction to the wireless access point device, where the fourth control instruction is used to instruct the wireless access point device to send WiFi data to the smart household control device. ZigBee data is sent or received within the second preset period. When the second preset period ends, the smart household control device notifies the wireless access point device that the wireless access point device may send WiFi data to the smart household control device, so as to continue to transmit WiFi data, ensuring normal WiFi communication.

Optionally, when the wireless access point device is provided with the WiFi communications module and the ZigBee communications module, and the wireless access point device performs WiFi communication with user equipment by using the WiFi communications module and performs ZigBee communication with the smart household device by using the ZigBee communications module, if the wireless access point device needs to transmit WiFi data and ZigBee data, the wireless access point device determines whether the current timing moment is within the first preset period or second preset period in the preset timing cycle. If the current timing moment is within the first preset period, the wireless access point device performs WiFi data transmission with the user equipment, and when the first preset period ends, the wireless access point device sends a control instruction to the user equipment to instruct the user equipment to stop sending WiFi data to the wireless access point device, to avoid interference caused to WiFi communication by ZigBee communication within the second preset period; or if the current timing moment is within the second preset period, the wireless access point device performs ZigBee data transmission with the smart household device. WiFi communication and ZigBee communication are performed within different periods, so that mutual interference can be avoided between WiFi communication and ZigBee communication, and quality of WiFi communication and ZigBee communication is ensured.

By executing the foregoing steps, if WiFi data and ZigBee data need to be transmitted, the smart household control device sends or receives WiFi data within the first preset period in the preset timing cycle, and sends or receives ZigBee data within the second preset period. The period for sending or receiving WiFi data is different from the period for sending or receiving ZigBee data, so that mutual interference can be avoided between WiFi communication and ZigBee communication, and quality of WiFi communication and ZigBee communication is ensured.

To better implement the foregoing data transmission method in this embodiment of the present invention, the present invention further provides a device configured to implement the foregoing method.

Figure 3:
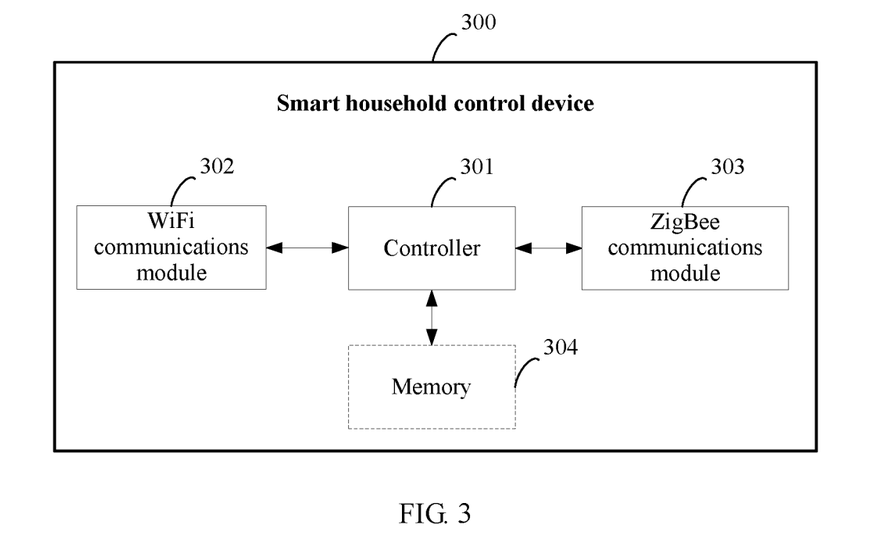
FIG. 3 is a schematic structural diagram of a smart household control device according to an embodiment of the present invention.

Referring to FIG. 3, FIG. 3 is a schematic structural diagram of a smart household control device according to an embodiment of the present invention. As shown in FIG. 3, a smart household control device 30 includes a controller 301, a WiFi communications module 302, and a ZigBee communications module 303. The controller 301, the WiFi communications module 302, and the ZigBee communications module 303 may be connected by using a bus or in another manner.

Although it is not shown in FIG. 3, the smart household control device 30 may further include a power module, configured to supply power to each module of the smart household control device 30. The smart household control device 30 may further includes a Bluetooth communications module, or the like. The smart household control device 30 may further include a user interface, configured to receive an operation instruction from a user, or configured to output, display an image or data. The user interface includes a touchscreen, a button, a microphone, a display screen, a speaker, and the like. Details are not described herein.

The controller 301 is a control center of the smart household control device 30 and responsible for determining WiFi communication or ZigBee communication and switching between WiFi communication and ZigBee communication. The controller 301 may be a general processor, such as a central processing unit (English: Central Processing Unit, CPU), or may be a micro controller unit (English: Micro Controller Unit, MCU). The controller 301 may further include a hardware chip, and the hardware chip may be a combination of one or more of the following: an application specific integrated circuit (English: Application Specific Integrated Circuit, ASIC), a field programmable gate array (English: Field Programmable Gate Array, FPGA), or a complex programmable logic device (English: Complex Programmable Logic Device, CPLD). The controller 301 can process data received by using the WiFi communications module 302 or the ZigBee communications module 303. The controller 301 may also process data to be sent to the WiFi communications module 302 or the ZigBee communications module 303 for performing wireless transmission.

If the controller 301 is an MCU or a hardware chip, the controller 301 implements the data transmission method described in the foregoing embodiment according to a program and data stored in a memory of the controller 301. The memory includes a random access memory (English: Random Access Memory, RAM) and a read-only memory (English: Read-Only Memory, ROM), and the data includes the preset timing cycle, the first preset period, and the second preset period that are described in the foregoing embodiments. If the controller 301 is a CPU or a combination including a CPU, the smart household control device 30 further includes a memory 304 configured to store program code for data transmission, and transmits the program code to the CPU, and the CPU executes the data transmission method described in the foregoing embodiment. The memory 304 is further configured to store data such as the preset timing cycle, the first preset period, and the second preset period that are described in the foregoing embodiments. The memory 304 may include a volatile memory (English: Volatile Memory), such as a RAM. The memory 304 may further include a non-volatile memory (English: Non-Volatile Memory), such as a ROM, a hardware dive disk (English: Hard Disk Drive, HDD), or a solid-state drive (English: Solid-State Drive, SSD). The memory 304 may further include a combination of the foregoing various memories. The memory 304 is connected to the controller 301 by using a bus.

The WiFi communications module 302 can provide a WiFi communications capability for the smart household control device 30, meeting the IEEE802.11 standard. The WiFi communications module 302 is connected to another device of a same type in a wireless manner by using a WiFi wireless communications protocol, so as to transmit sensor information, transmit a large volume of information, receive a control instruction, receive information, or the like. The ZigBee communications module 303 supports a ZigBee protocol stack, meeting the IEEE802.15.4 standard and the ZigBee2010 technical standard. The ZigBee communications module 303 is connected to another device of a same type in a wireless manner by using a ZigBee protocol, so as to transmit sensor information, receive a control instruction, or the like. The WiFi communications module 302 and the ZigBee communications module 303 may be connected to the controller 301 by using an industry standard architecture (English: Industry Standard Architecture, ISA) bus, a peripheral component interconnect (English: Peripheral Component Interconnect, PCI) bus, an extended industry standard architecture (English: Extended Industry Standard Architecture, EISA) bus, an inter integrated circuit (English:

Inter Integrated Circuit, IIC), a serial peripheral interface (English: Serial Peripheral Interface, SPI), a universal serial bus (English: Universal Serial Bus, USB), an asynchronous serial interface RS232, or the like.

In this embodiment of the present invention, the controller 301 is configured to perform the following operations:

if the smart household control device 30 needs to send or receive WiFi data and ZigBee data, controlling, by the controller 301, the WiFi communications module 302 to send or receive WiFi data within a first preset period in each preset timing cycle; and when the first preset period ends, controlling the WiFi communications module 302 to stop sending or receiving WiFi data, and controlling the WiFi communications module 302 to send a first control instruction to a wireless access point device, where the first control instruction is used to instruct the wireless access point device to stop sending WiFi data to the smart household control device 30; and controlling, by the controller 301, the ZigBee communications module 303 to send or receive ZigBee data within a second preset period in each preset timing cycle, where the first preset period and the second preset period do not overlap.

Optionally, the controller 301 is further configured to:

control the ZigBee communications module 303 to send or receive ZigBee data within the first preset period, and control the ZigBee communications module 303 to retransmit ZigBee data if ZigBee data fails to be sent, where duration from a start of the first preset period to a start of the second preset period is less than maximum duration for retransmitting ZigBee data.

Optionally, the controller 301 is further configured to:

when the second preset period ends, control the ZigBee communications module 303 to stop sending or receiving ZigBee data, and control the ZigBee communications module 303 to send a second control instruction to a smart household device, where the second control instruction is used to instruct the smart household device to stop sending ZigBee data to the smart household control device 30.

Optionally, the controller 301 is further configured to:

when the first preset period ends, control the ZigBee communications module 303 to send a third control instruction to the smart household device, where the third control instruction is used to instruct the smart household device to send ZigBee data to the smart household control device 30.

Optionally, the controller 301 is further configured to:

when the second preset period ends, control the WiFi communications module 302 to send a fourth control instruction to the wireless access point device, where the fourth control instruction is used to instruct the wireless access point device to send WiFi data to the smart household control device 30.

It should be noted that for functions of function modules in the smart household control device 30 described in this embodiment of the present invention, refer to related descriptions of the smart household control device in the embodiment shown in FIG. 2, and details are not repeated herein.

To facilitate better implementation of the embodiment of the present invention, an embodiment of the present invention further provides a smart household control device, and the smart household control device includes a module or unit configured to execute the data transmission method described in the foregoing embodiment shown in FIG. 2.

To facilitate better implementation of the embodiment of the present invention, an embodiment of the present invention further provides a computer readable storage medium.

The computer readable storage medium stores one or more computer programs. The computer readable storage medium may be a magnetic disk, a compact disc, a ROM, a RAM, or the like. The one or more computer programs run on one or more controllers in the smart household control device, and when the computer program runs, a process of the foregoing method embodiment shown in FIG. 2 can be implemented.

To sum up, refer to the embodiments of the present invention, when WiFi data and ZigBee data need to be transmitted, the smart household control device sends or receives WiFi data within the first preset period in the preset timing cycle, and sends or receives ZigBee data within the second preset period. The period for sending or receiving WiFi data is different from the period for sending or receiving ZigBee data, so that mutual interference can be avoided between WiFi communication and ZigBee communication, and quality of WiFi communication and ZigBee communication is ensured.

Although the present invention is described herein with reference to the embodiments, a scope of the claims of the present invention should not be limited by the description. In a process of implementing the present invention that claims protection, a person skilled in the art may understand and implement all or some procedures in the foregoing embodiments by viewing the accompanying drawings, disclosed content, and the accompanying claims. Equivalent modifications made in accordance with the claims of the present invention shall fall within the scope of the present invention. In the claims, "comprising" does not exclude another component or another step, and "a" or "one" does not exclude a case of a plurality. A single controller or another unit may implement several functions enumerated in the claims. Some measures are recorded in dependent claims that are different from each other, but this does not mean that these measures cannot be combined to produce a better effect. A computer program may be stored/distributed in an appropriate medium such as an optical storage medium or a solid-state medium and be provided together with other hardware or be used as a part of hardware, or may be distributed in another manner, for example, by using the Internet (English: Internet), or another wired or wireless system.

What is claimed is:

1. A data transmission method, wherein the method comprises:
    sending or receiving, by a smart household control device, WiFi data within a first preset period in each preset timing cycle when the smart household control device needs to send or receive WiFi data and ZigBee data;
    stopping, by the smart household control device, sending or receiving the WiFi data when the first preset period ends;
    sending, by the smart household control device, a first control instruction to a wireless access point device when the first preset period ends, wherein the first control instruction instructs the wireless access point device to stop sending the WiFi data to the smart household control device; and
    sending or receiving, by the smart household control device, ZigBee data within a second preset period in each preset timing cycle, wherein the first preset period and the second preset period do not overlap.

2. The method according to claim 1, wherein the method further comprises:
    sending or receiving, by the smart household control device, the ZigBee data within the first preset period; and retransmitting, by the smart household control device, the ZigBee data when the smart household control device fails to send the ZigBee data, wherein duration from a start of the first preset period to a start of the second preset period is less than maximum duration for retransmitting the ZigBee data.

3. The method according to claim 2, further comprising: sending, by the smart household control device, a fourth control instruction to the wireless access point device when the second preset period ends, wherein the fourth control instruction instructs the wireless access point device to send the WiFi data to the smart household control device.

4. The method according to claim 1, further comprising: stopping, by the smart household control device, sending or receiving the ZigBee data when the second preset period ends; and
sending, by the smart household control device, a second control instruction to a smart household device when the second preset period ends, wherein the second control instruction instructs the smart household device to stop sending the ZigBee data to the smart household control device.

5. The method according to claim 4, further comprising: sending, by the smart household control device, a third control instruction to the smart household device when the first preset period ends, wherein the third control instruction instructs the smart household device to send the ZigBee data to the smart household control device.

6. The method according to claim 5, further comprising: sending, by the smart household control device, a fourth control instruction to the wireless access point device when the second preset period ends, wherein the fourth control instruction instructs the wireless access point device to send the WiFi data to the smart household control device.

7. The method according to claim 4, further comprising: sending, by the smart household control device, a fourth control instruction to the wireless access point device when the second preset period ends, wherein the fourth control instruction instructs the wireless access point device to send the WiFi data to the smart household control device.

8. The method according to claim 1, further comprising: sending, by the smart household control device, a fourth control instruction to the wireless access point device when the second preset period ends, wherein the fourth control instruction instructs the wireless access point device to send the WiFi data to the smart household control device.

9. A smart household control device, wherein the smart household control device comprises a WiFi transceiver, a ZigBee transceiver, at least one processor, and one or more memories coupled to the at least one processor and storing programming instructions for execution by the at least one processor to perform operations comprising:
controlling the WiFi transceiver to send or receive WiFi data within a first preset period in each preset timing cycle when the smart household control device needs to send or receive WiFi data and ZigBee data;
controlling the WiFi transceiver to stop sending or receiving the WiFi data when the first preset period ends;
controlling the WiFi transceiver to send a first control instruction to a wireless access point device when the first preset period ends, wherein the first control instruction instructs the wireless access point device to stop sending the WiFi data to the smart household control device; and
controlling the ZigBee transceiver to send or receive ZigBee data within a second preset period in each preset timing cycle, wherein the first preset period and the second preset period do not overlap.

10. The smart household control device according to claim 9, wherein the programming instructions are for execution by the at least one processor to:
control the ZigBee transceiver to send or receive the ZigBee data within the first preset period; and
control the ZigBee transceiver to retransmit the ZigBee data if the ZigBee data fails to be sent, wherein duration from a start of the first preset period to a start of the second preset period is less than maximum duration for retransmitting the ZigBee data.

11. The smart household control device according to claim 10, wherein the programming instructions are for execution by the at least one processor to:
control the WiFi transceiver to send a fourth control instruction to the wireless access point device when the second preset period ends, wherein the fourth control instruction instructs the wireless access point device to send the WiFi data to the smart household control device.

12. The smart household control device according to claim 9, wherein the programming instructions are for execution by the at least one processor to:
control the ZigBee transceiver to stop sending or receiving the ZigBee data; and
control the ZigBee transceiver to send a second control instruction to a smart household device when the second preset period ends, wherein the second control instruction instructs the smart household device to stop sending the ZigBee data to the smart household control device.

13. The smart household control device according to claim 12, wherein the programming instructions are for execution by the at least one processor to:
control the ZigBee transceiver to send a third control instruction to the smart household device when the first preset period ends, wherein the third control instruction instructs the smart household device to send the ZigBee data to the smart household control device.

14. The smart household control device according to claim 13, wherein the programming instructions are for execution by the at least one processor to:
control the WiFi transceiver to send a fourth control instruction to the wireless access point device when the second preset period ends, wherein the fourth control instruction instructs the wireless access point device to send the WiFi data to the smart household control device.

15. The smart household control device according to claim 12, wherein the programming instructions are for execution by the at least one processor to:
control the WiFi transceiver to send a fourth control instruction to the wireless access point device when the second preset period ends, wherein the fourth control instruction instructs the wireless access point device to send the WiFi data to the smart household control device.

16. The smart household control device according to claim 9, wherein the programming instructions are for execution by the at least one processor to:

control the WiFi transceiver to send a fourth control instruction to the wireless access point device when the second preset period ends, wherein the fourth control instruction instructs the wireless access point device to send the WiFi data to the smart household control device.

17. A non-transitory computer readable storage medium having stored thereon executable instructions that when executed by an apparatus cause the apparatus to function as a smart household control device to perform operations comprising:

sending or receiving WiFi data within a first preset period in each preset timing cycle when the smart household control device needs to send or receive WiFi data and ZigBee data;

stopping sending or receiving the WiFi data when the first preset period ends;

sending, by the smart household control device, a first control instruction to a wireless access point device when the first preset period ends, wherein the first control instruction instructs the wireless access point device to stop sending the WiFi data to the smart household control device; and sending or receiving ZigBee data within a second preset period in each preset timing cycle, wherein the first preset period and the second preset period do not overlap.

18. The non-transitory computer readable storage medium according to claim 17, wherein the operations further comprise:

sending or receiving the ZigBee data within the first preset period; and retransmitting the ZigBee data when the apparatus fails to send the ZigBee data, wherein duration from a start of the first preset period to a start of the second preset period is less than maximum duration for retransmitting the ZigBee data.

19. The non-transitory computer readable storage medium according to claim 17, wherein the operations further comprise:

stopping sending or receiving the ZigBee data when the second preset period ends; and sending a second control instruction to a smart household device when the second preset period ends, wherein the second control instruction instructs the smart household device to stop sending the ZigBee data to the smart household control device.

20. The non-transitory computer readable storage medium according to claim 19, wherein the operations further comprise:

sending a third control instruction to the smart household device when the first preset period ends, wherein the third control instruction instructs the smart household device to send the ZigBee data to the smart household control device.

* * * * *